US010207206B2

(12) United States Patent
Chau

(10) Patent No.: US 10,207,206 B2
(45) Date of Patent: Feb. 19, 2019

(54) LIQUID PROCESSING APPARATUS

(71) Applicant: Yiu Chau Chau, Hong Kong (CN)

(72) Inventor: Yiu Chau Chau, Hong Kong (CN)

( * ) Notice: Subject to any disclaimer, the term of this patent is extended or adjusted under 35 U.S.C. 154(b) by 123 days.

(21) Appl. No.: 15/312,160

(22) PCT Filed: Jun. 18, 2014

(86) PCT No.: PCT/CN2014/080205
§ 371 (c)(1),
(2) Date: Nov. 17, 2016

(87) PCT Pub. No.: WO2015/192341
PCT Pub. Date: Dec. 23, 2015

(65) Prior Publication Data
US 2017/0087484 A1    Mar. 30, 2017

(51) Int. Cl.
*B01D 27/08*    (2006.01)
*B01D 35/30*    (2006.01)
(Continued)

(52) U.S. Cl.
CPC .............. *B01D 27/08* (2013.01); *B01D 35/30* (2013.01); *C02F 5/10* (2013.01); *B01D 2201/16* (2013.01);
(Continued)

(58) Field of Classification Search
None
See application file for complete search history.

(56) References Cited

U.S. PATENT DOCUMENTS 3,313,416 A * 4/1967 Rosaen ................ B01D 35/027
210/90
3,855,127 A * 12/1974 Nakajima .............. B01D 35/04
210/130
(Continued)

FOREIGN PATENT DOCUMENTS

CN         2120232      10/1992
CN        201171927     12/2008
(Continued)

OTHER PUBLICATIONS

International Searching Authority, "International Search Report," issued in connection with PCT Patent Application No. PCT/CN2014/080205, dated Mar. 3, 2015, 4 pages.
(Continued)

Primary Examiner — Benjamin M Kurtz
(74) Attorney, Agent, or Firm — Hanley, Flight & Zimmerman, LLC

(57) ABSTRACT

An embodiment of the present disclosure provides a liquid processing apparatus, including: a housing having an upper end opening and a sealed bottom; a cover covering the upper end opening of the housing; a sealing portion provided inside the housing, it being sealed between the sealing portion and an inner wall of the housing, and a sealed accommodation space being formed between the sealing portion and the bottom of the housing; a processing portion provided within the accommodation space and configured to process a liquid flowing into the accommodation space, an upper end of the processing portion having a guide portion; a liquid inflow portion and a liquid outflow portion provided at an upper part of the housing. According the embodiment of the present disclosure, the liquid inflow portion and the liquid outflow portion are provided at the upper part of the housing, which may facilitate installation of the liquid inflow portion and the liquid outflow portion. A seal ring for
(Continued)

sealing is provided between an inner wall surface of the guide portion and an outer side edge of a connector, hence, the processing portion may obtain a more reliable sealing effect.

8 Claims, 11 Drawing Sheets

(51) Int. Cl.
    *C02F 5/10*     (2006.01)
    *C02F 1/56*     (2006.01)
    *C02F 1/52*     (2006.01)
    *C02F 1/28*     (2006.01)

(52) U.S. Cl.
    CPC .......... *B01D 2201/29* (2013.01); *C02F 1/283* (2013.01); *C02F 1/5281* (2013.01); *C02F 1/56* (2013.01); *C02F 2001/5218* (2013.01); *C02F 2201/004* (2013.01); *C02F 2201/006* (2013.01); *C02F 2303/22* (2013.01)

(56) References Cited

U.S. PATENT DOCUMENTS

| | | | |
|---|---|---|---|
| 4,617,117 A | 10/1986 | Messinger et al. | |
| 5,328,609 A | 7/1994 | Magnusson et al. | |
| 6,217,755 B1 * | 4/2001 | Stifelman | B01D 35/027 210/116 |
| 2007/0271884 A1 * | 11/2007 | Pearson | B01D 46/0012 55/410 |
| 2009/0057213 A1 * | 3/2009 | Schiavon | B01D 29/21 210/132 |
| 2011/0303600 A1 | 12/2011 | Honermann et al. | |
| 2013/0334126 A1 * | 12/2013 | Van Every | B01D 35/30 210/444 |

FOREIGN PATENT DOCUMENTS

| | | |
|---|---|---|
| CN | 102271778 | 12/2011 |
| CN | 202315708 | 7/2012 |
| CN | 202360796 | 8/2012 |
| CN | 202620810 | 12/2012 |

OTHER PUBLICATIONS

The State Intellectual Property Office of People's Republic of China, First Office Action issued in connection with Chinese Application No. 201480075860.X with English translation, dated Sep. 5, 2018, 8 pages.

The State Intellectual Property Office of People's Republic of China, Search Report issued in connection with Chinese Application No. 201480075860.X, with English translation, dated Sep. 5, 2018, 5 pages.

Xin, Changping, Modern fashion home appliance maintenance skills point, Mechanical industry press, Sep. 30, 2013, Pages 9-12, with English machine translation, 8 pages.

* cited by examiner (A)

(B)

(A)

(B)

LIQUID PROCESSING APPARATUS

TECHNICAL FIELD

The present disclosure relates to the field of fluid processing technology, and in particular to a liquid processing apparatus.

BACKGROUND

A liquid processing apparatus usually uses one or more liquid processing media to process various liquid, such as water, and alcohol, etc., and usually includes one or more liquid processing units accommodating a liquid processing medium. When liquid passes through the liquid processing medium, impurities and contaminants therein are removed by physical and chemical reactions with the liquid processing medium. A typical example of such a liquid processing apparatus is an apparatus for purifying and softening water, such chemical contaminants and particle contaminants and the like in the liquid as chlorides, heavy metals, and sulfides are removed on the one hand, and calcium, and magnesium, etc. in the water are removed on the other hand, so that the water is softened. Such liquid processing apparatuses may provide purified water suitable for direct drinking and washing water for families, and become important articles for family lives.

A softening apparatus is substantially unique means for processing hard water for a long time, and some other substitutional means, such as a magnetic device, an electromagnetic device, an RF device, and a catalytic agent, are not proven to be effective. A template-assisted crystallization (TAC) emerged in these years is a very effective fluid processing medium, which uses special polymer particles as a fluid processing medium to make hard water mineral substances (such as $CaCO_3$) in water to settle in forms of innocuous inactive micro crystallized particles and attach to surfaces of the polymer particles, separate from the polymer particles when they grow into certain sizes and go back into the water, and suspend in the water in forms of nonreactive nonadhesive crystal particles, thereby efficiently avoiding formation of scales. Thus, a processing system of the TAC type is different from a conventional fluid processing system, does not block hard water mineral substances, and only makes the hard water mineral substances to become crystal particle forms.

An example of a fluid processing system using the TAC technology is a system using Next-ScaleStop as fluid processing media. According to international operating rules for avoiding scales, an efficiency percentage of the Next-ScaleStop fluid processing media reaches 96%, and is more effective than other water softeners. Advantages of the Next-ScaleStop exist in: (1) needing no chemicals, hence, it is relatively environmentally protective; (2) providing scale prevention protection for a whole house; (3) a life of the medium is long, and is not consumed due to reaction; (4) beneficial mineral substances in water will be reserved; and (5) there exists no sense of adhesion and smoothness like that in softened water. The Next-ScaleStop fluid processing media are polymer particles, a size of which being 0.55~0.85 mm (about 20×40 mesh), and a bulk density being about 0.67 kg/l.

In the TAC water softening technology, there exist nucleation parts of atomic sizes on surfaces of the used polymer particles (or polymer beads) (such as Next-ScaleStop). In these parts, solved hard water substances are transformed into micro "seed crystals". Once the seed crystals are produced and grow into a certain size, they will be brought away from the surfaces of the polymer particles by water flowing through the template-assisted crystallization (TAC) fluid processing medium accommodated in a bed volume unit. Hence, action mechanisms of the TAC water softening technology are generally as follows: (1) solved hard water substances on surfaces of polymer particles having many nucleation parts are transformed into micro "seed crystals"; (2) as 10% growth of the seed crystals needs several hours, if water supply is stopped for the whole night, sizes of the seed crystals released from the TAC bed column are slightly larger than those of normal seed crystals, and after several minutes later of the water flow, at various flow rates, sizes of the seed crystals released from the particle surfaces of the TAC bed column become normal again (with a range of variation of within 10% only); and (3) newly-produced seed crystals adhere to the nucleation parts of atomic size and grow larger, until they are washed into the water flow, and a rate of release of the seed crystals is proportional to a flow rate of the water.

Furthermore, structures of many liquid processing apparatuses are disclosed in the related art. For example, patent document 1 (U.S. Pat. No. 4,617,117) discloses a liquid processing apparatus. FIG. 1 is a schematic diagram of the liquid processing apparatus of patent document 1. As shown in FIG. 1, the liquid processing apparatus includes a housing 1, an inlet 7 and an outlet 12 being provided on a bottom of the housing 1, an accommodation cavity 2, an inflow passage 8, an outflow conduit 10 and an outflow passage 11 being provided within the housing 1. During use, a liquid flows in from the inlet 7, and enters into the accommodation cavity 2 through the internal inflow passage 8; and when a level of the liquid is higher than an upper end opening of the outflow conduit 10, the liquid enters into the outflow conduit 10, and flows to the outlet 12 through the outflow passage 11.

As shown in FIG. 1, the liquid processing apparatus further includes a cover 16 and a sealing portion 17; wherein, the sealing portion 17 is provided at a top of the housing 1, and an O-shaped seal ring 6 is provided between the sealing portion 17 and an inner wall of the housing 1, so as to seal the accommodation cavity 2; and the cover 16 is located at an upper part of the sealing portion 17, and is used to cover and protect an upper end part of the housing 1.

Furthermore, liquid filters of different structures or filter core structures are respectively disclosed in patent document 2 (CN102271778A), patent document 3 (CN202478706U), patent document 4 (CN202620810U), and patent document 5 (CN103286003A).

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

It was found by the inventor that in patent document 1, when the housing 1 is subjected to lateral press or a tensile action, a part of the housing near the sealing portion 17 will be extended in a certain direction, thereby lowering pressure to which the O-shaped seal ring is subjected in this direction, affecting a sealing effect between the O-shaped seal ring and the housing 1 and the sealing portion 17, even resulting in pressure leakage in the accommodation cavity 2. Furthermore, permanent deformation will also be produced in the housing 1 after a long period of use, thereby forming extension in a certain direction, which may also lower the sealing effect of the sealing portion.

An embodiment of this application provides a liquid processing apparatus, which may increase strength of a part of a housing near a sealing portion, and lower an extension level of the housing, so that a good sealing effect of the sealing portion may be maintained.

According to an aspect of the embodiment of the present disclosure, there is provided a liquid processing apparatus, including:

a housing having an upper end opening and a sealed bottom, an outer wall of the housing close to the upper end opening being provided with threads;

a cover covering the upper end opening of the housing and connected to the housing by the threads;

a sealing portion provided inside the housing and located beneath a position of an inner wall of the housing to which the threads correspond, the sealing portion being in a shape of a circular disk and having a recessed portion, a seal ring for sealing being provided between a periphery of the sealing portion and the inner wall of the housing, and a sealed accommodation space being formed between the sealing portion and the bottom of the housing;

a processing portion provided within the accommodation space and in which a liquid processing medium being provided, a peripheral wall of the processing portion being sealed, an upper end of the processing portion having a guide portion, a liquid entering into the processing portion through a bottom of the processing portion, and a liquid processed by the processing portion being guided by the guide portion;

a liquid inflow portion and a liquid outflow portion provided at an upper part of the housing, the liquid inflow portion and liquid outflow portion being at the same horizontal level when an axis of the housing is in parallel with the gravity direction; wherein, the liquid flows into the accommodation space through the liquid inflow portion, and the liquid processed by the processing portion flows out of the accommodation space through the liquid outflow portion; and a connector connected between the guide portion and the liquid outflow portion and configured to guide the liquid processed by the processing portion to the liquid outflow portion; wherein, the connector has a protrusion portion, the protrusion portion being accommodated in the recessed portion of the sealing portion, and it is sealed by the seal ring between an outer side edge of the connector and an inner wall surface of the guide portion.

An advantage of the embodiment of the present disclosure exists in that the liquid inflow portion and liquid outflow portion are provided at an upper part of the housing, and a connection portion is provided, which may facilitate installation of the liquid inflow portion and liquid outflow portion; and the seal ring for sealing is provided between an inner wall surface of the guide portion and an outer side edge of the connector, hence, the processing portion may obtain a more reliable sealing effect.

With reference to the following description and drawings, the particular embodiment of the present disclosure is disclosed in detail, and the principle of the present disclosure and the manners of use are indicated. It should be understood that the scope of the embodiment of the present disclosure is not limited thereto. The embodiment of the present disclosure contains many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiment of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Figure 1:
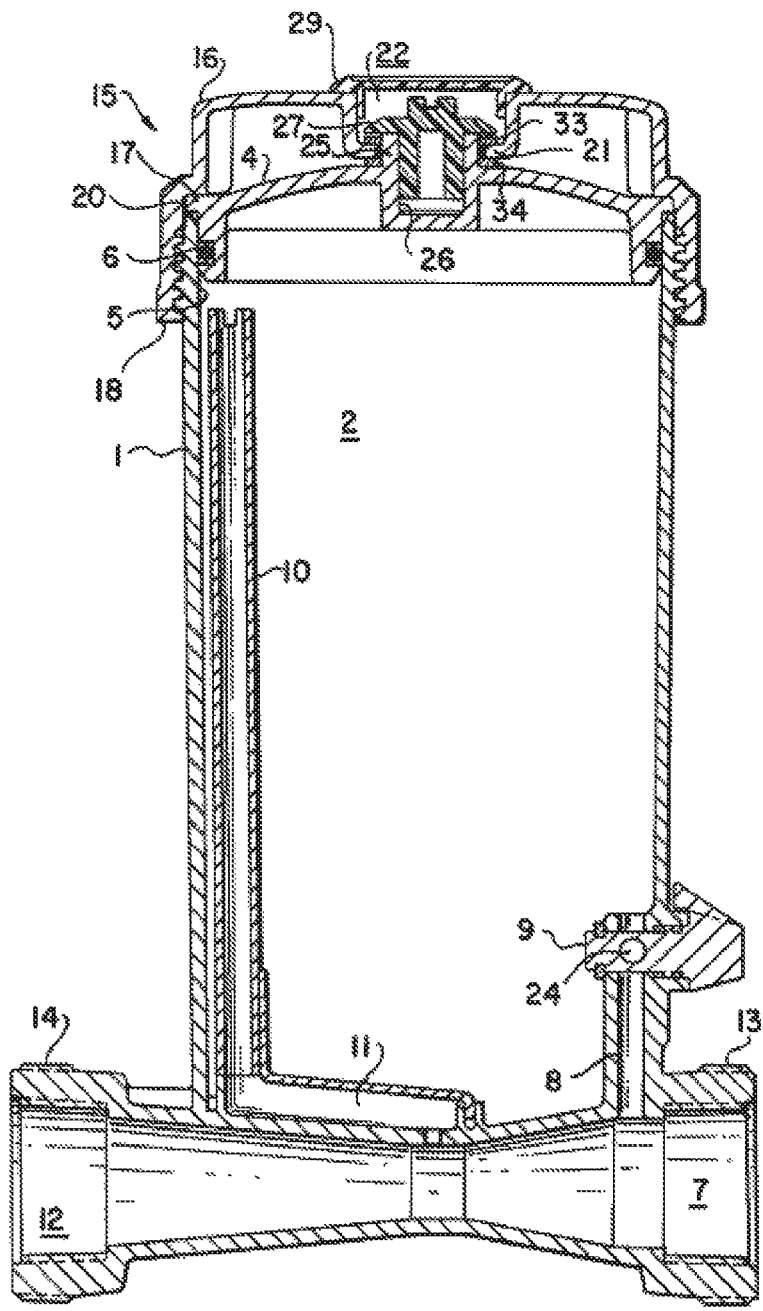
FIG. 1 is a schematic diagram of a structure of the liquid processing apparatus of patent document 1.
Figure 2:
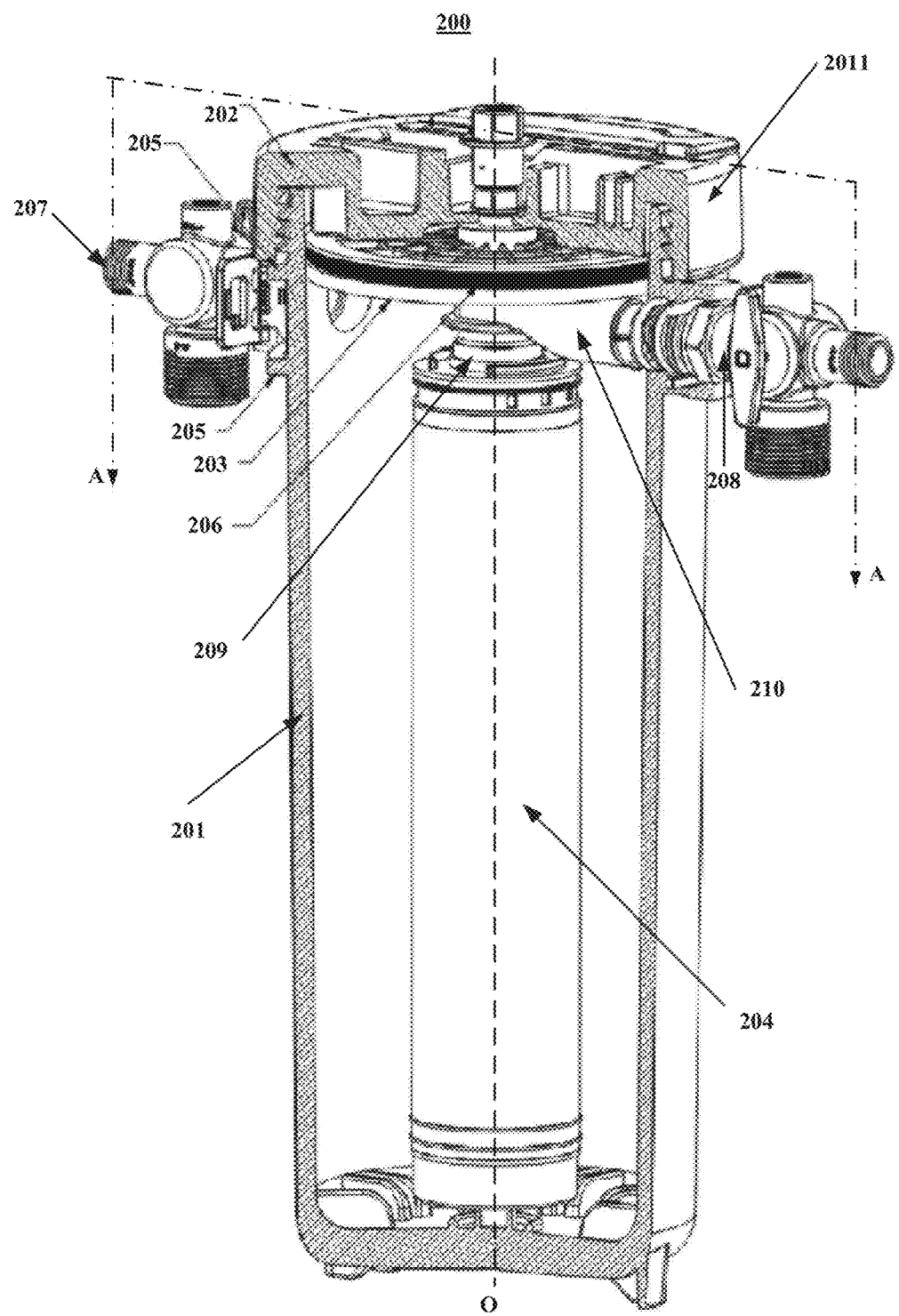
FIG. 2 is a schematic diagram of a structure of the liquid processing apparatus of the embodiment of this application.
Figure 3:
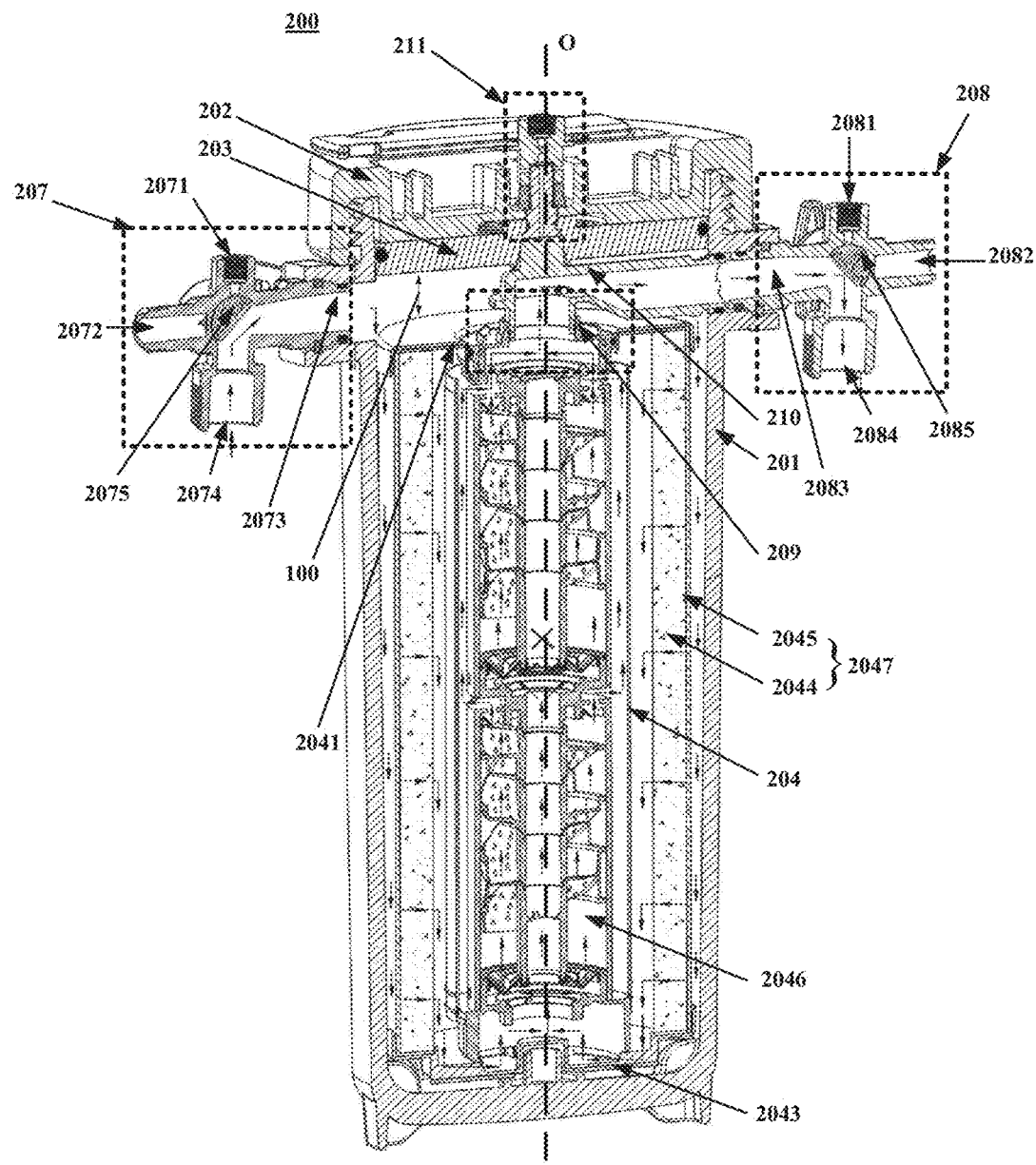
FIG. 3 is an axial cross-section view of the liquid processing apparatus of the embodiment of this application obtained along an A-A direction in FIG. 2.

The embodiment of this application provides a liquid processing apparatus. FIG. 2 is a schematic diagram of a structure of the liquid processing apparatus of the embodiment of this application, and FIG. 3 is an axial cross-section view of the liquid processing apparatus of the embodiment of this application obtained along an A-A direction in FIG. 2. As shown in FIG. 2, the liquid processing apparatus 200 includes a housing 201, a cover 202, a sealing portion 203, a processing portion 204, a flange portion 205, a liquid inflow portion 207, a liquid outflow portion 208 and a connector 210.

In this embodiment, the housing 201 has an upper end opening and a sealed bottom (not shown); the cover 202 covers the upper end opening of the housing 201; the sealing portion 203 is provided inside the housing 201, a seal between the sealing portion 203 and an inner wall of the housing 201 being formed, and a sealed accommodation space being formed between the sealing portion 203 and the bottom of the housing 201; the processing portion 204 is provided within the accommodation space and configured to process a liquid flowing into the accommodation space; and the flange portion 205 is provided on an outer wall of the housing 201, and is provided at a position corresponding to the accommodation space.

In the embodiment of this application, the housing 201 may be in a shape of a barrel, and has a central axis O, and a cross section of the housing 201 may be circular. However, this application is not limited thereto, and it may in other shapes, for example.

In the embodiment of this application, a peripheral wall of the processing portion 204 is sealed. An upper end of the processing portion 204 has a guide portion 209, a liquid entering into the processing portion 204 through a bottom of the processing portion 204, and a liquid processed by the processing portion 204 is guided by the guide portion 209. The connector 210 connects between the guide portion 209 and the liquid outflow portion 208, and a seal is formed between the surface of inner wall of the guide portion 209 and the outer flange of the connector 210, thus the processed liquid is guided to the liquid outflow portion 208 via the guide portion 209 and the connector 210. As shown in FIG. 3, a processing medium 2046 may be provided in the processing portion 204. The processing medium 2046 may physically or chemically react with contaminants or ions in a liquid, so as to process the liquid. In this embodiment, the processing medium may be a processing medium based on the template-assisted crystallization (TAC) technology, such as a Next-ScaleStop liquid processing medium. The Background may be referred to for detailed description of the liquid processing medium based on the TAC technology, which shall not be described in the embodiment of this application any further.

As shown in FIG. 3, in this embodiment, a preprocessing portion 2047 is provided outside of the processing portion 204, and is configured to protect the processing medium 2046. In this embodiment, the preprocessing portion 2047 may include a carbon block 2044 and/or a prefilter 2045, and the prefilter 2045 may be, for example, a particle prefilter; for example, the carbon block 2044 and/or the prefilter 2045 may preliminarily prefilter the liquid. It should be noted that this embodiment is not limited thereto, and the preprocessing portion 2047 may be a combination of processing media of any type, and may not be limited to a carbon block and/or a prefilter only.

In this embodiment, a bottom 2043 of the preprocessing portion 2047 is sealed, and an upper end of it has an annular top cover 2041; the liquid enters into an inner space of the preprocessing portion 2047 through a peripheral wall of the preprocessing portion 2047, and a liquid processed by the preprocessing portion 2047 may be processed by the processing portion 204 and then guided by the guide portion 209 of the processing portion 204; wherein, a seal ring 2042 (refer to FIG. 14) for sealing is provided between a peripheral wall 214 (refer to FIG. 14) of the processing portion 204 and an inner side edge of the top cover 2041 of the preprocessing portion 2047.

In the embodiment of this application, the sealing portion 203 may be in a shape of a circular disk, so as to be fitted with a circular cross section of the housing 201, and the shape of the circular disk enables the sealing portion 203 to occupy relatively few spaces. Furthermore, as shown in FIG. 2, a seal ring 206 may be provided between a periphery of the sealing portion 203 and the inner wall of the housing 201, the seal ring 206 may be made of an elastic material, such as rubber. Hence, a sealing effect between the sealing portion 203 and the inner wall of the housing 201 may be further improved.

In the embodiment of this application, an outer wall of the housing 201 close to the upper end opening may be provided with threads 2011, hence, the cover 202 may be connected to the housing 201 by the threads 2011; and the sealing portion 203 may be provided beneath a position of an inner wall of the housing to which the threads 2011 correspond, hence, the flange portion 205 may be designed more close to the sealing portion 203, thereby further increasing strength of a part of the housing 201 near the flange portion 205.

As shown in FIG. 2, in the embodiment of this application, the flange portion 205 may include more than one flanges, each of which being provided around the whole periphery of the outer wall of the housing 201, and the flanges being provided in parallel with each other, thereby improving the strength of the housing 201, and making the housing 201 uneasy to be deformed.

In the embodiment of this application, the flange portion 205 is provided at a position corresponding to the accommodation space at the outer wall of the housing 201. As the flange portion is provided beneath the sealing portion 203 and is able to improve the strength of the housing beneath the sealing portion 203, when the housing 201 is subjected to lateral press or a tensile action, it is not prone to be extended in a direction. And in a case of long-term use of the liquid processing apparatus, the housing beneath the sealing portion 203 is not prone to extended and deformed, thereby maintaining the sealing effect between the sealing portion 203 and the inner wall of the housing 201.

As shown in FIG. 2, in the embodiment of this application, the liquid processing apparatus 200 may further include a liquid inflow portion 207, a liquid outflow portion 208 and a guide portion 209; wherein, the liquid may flow into the accommodation space through the liquid inflow portion 207, and may be processed by the processing portion 204 in the accommodation space, and the processed liquid may be guided by the guide portion 209 and flow out of the accommodation space through the liquid outflow portion 208.

As shown in FIG. 3, the liquid inflow portion 207 and the liquid outflow portion 208 are provided at an upper part of the housing 201, hence, when the liquid processing apparatus is in a standing status, it is facilitated to install the liquid outflow portion 208 and the liquid inflow portion 207; and when the central axis O of the housing is in parallel with the gravity direction, the liquid inflow portion 207 and the liquid outflow portion 208 may at the same level, hence, installation of the liquid inflow portion and the liquid outflow portion may further be facilitated, and the adjacent liquid inflow portion and liquid outflow portion of the liquid processing apparatus may be conveniently installed in series.

As shown in FIG. 3, the liquid processing apparatus may further include the connector 210 configured to guide the liquid processed by the processing portion to the liquid outflow portion 208. In the embodiment of this application, the connector 210 may include a hollow cavity, the hollow cavity of the connector 210 being in communication with the guide portion 209. Hence, the processed liquid may be guided to the liquid outflow portion 208 through the guide portion 209 and the connector 210.

The liquid flow arrow shown in FIG. 3 indicates a flow path of the liquid in the liquid processing apparatus 200. As shown in FIG. 3, the liquid flows into the accommodation space from the liquid inflow portion 207, flows in a gap between a carbon block 2044 and the processing portion 204 through a side wall of the prefilter 2045 in the preprocessing portion 2047 and a side wall of the carbon block 2044, and then enters into the processing portion 204 from the bottom of the processing portion 204. The liquid is processed by the processing medium 2046 when it rises in the carbon block 2044, and thereafter, the liquid processed by the processing medium 2046 is guided to the liquid outflow portion 208 through the guide portion 209 and the connector 210 at an upper end of the processing portion 204.

Figure 4:
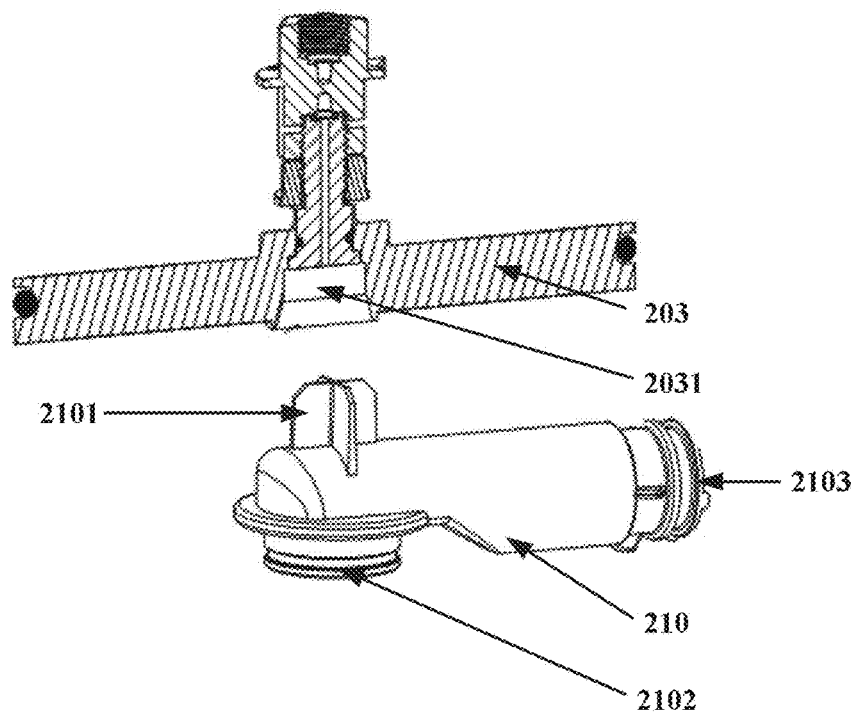
FIG. 4 are schematic diagrams of structures of a connector and a sealing portion.

In the embodiment of this application, a position of the connector 210 may be constrained by the sealing portion 203. FIG. 4 are schematic diagrams of structures of the connector and the sealing portion. As shown in FIG. 4, a protrusion portion 2101 may be provided on an upper surface of the connector 210, and a recessed portion 2031 may be provided at a lower surface of the sealing portion 203. In installation, as shown by the arrow in dotted lines in FIG. 4, the protrusion portion 2101 of the connector may be made to be accommodated in the recessed portion 2031 of the sealing portion 203, so as to constrain the position of the connector 210 in the horizontal direction.

Furthermore, in this embodiment, the connector 210 may further include a first connection portion 2102 and a second connection portion 2103; wherein, the first connection portion 2102 is used to connect the guide portion 209, and the second connection portion 2103 is used to connect the liquid outflow portion 208.

Furthermore, in this embodiment, the recessed portion 2031 may be provided at the center of the sealing portion 203, and may also be off the center. This application is not limited thereto, and a particular position may be set according to an actual situation.

Figure 5:
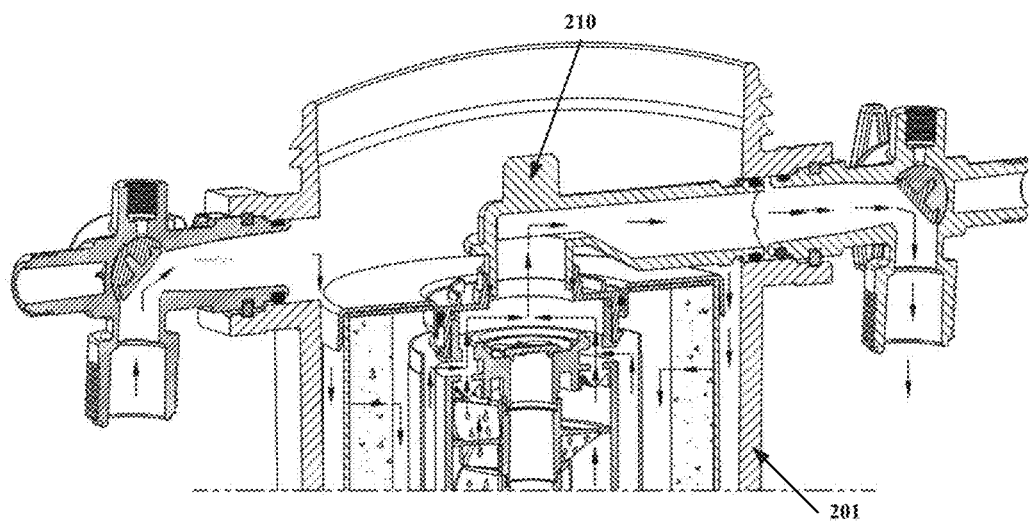
FIG. 5 is a disassembly schematic diagram of the connector.
Figure 6:
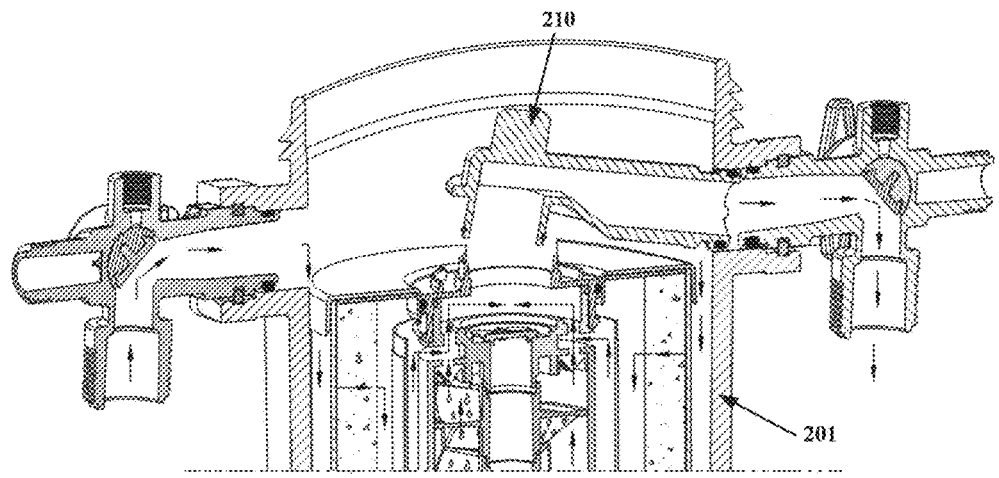
FIG. 6 is another disassembly schematic diagram of the connector.

FIGS. 5 and 6 are disassembly schematic diagrams of the connector. As shown in FIG. 5, when the connector 210 is disassembled, the cover 202 and the sealing portion 203 may be removed first; and then, as shown in FIG. 6, the connector 210 may be taken out from the upper end opening of the housing. An installation process of the connector 210 is contrary to the above disassembly process, which shall not be described herein any further.

In the embodiment of this application, by providing the connection portions, formation of a path for liquid flow in the liquid processing apparatus is facilitated, and installation and disassembly of the liquid processing apparatus are made more convenient.

In the embodiment of this application, as shown in FIG. 3, the liquid processing apparatus may further include an exhaust valve 211 configured to discharge air 100 between an upper surface of the processing portion 204 and a lower surface of the sealing portion 203.

Figure 7:
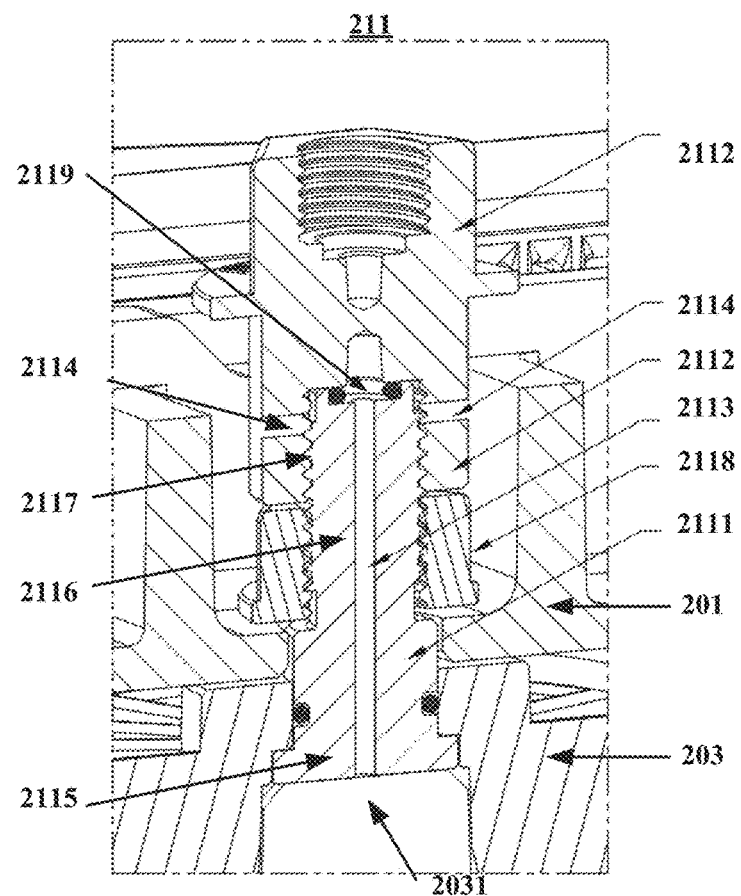
FIG. 7 is a schematic diagram of a structure of an exhaust valve in a closed state.
Figure 8:
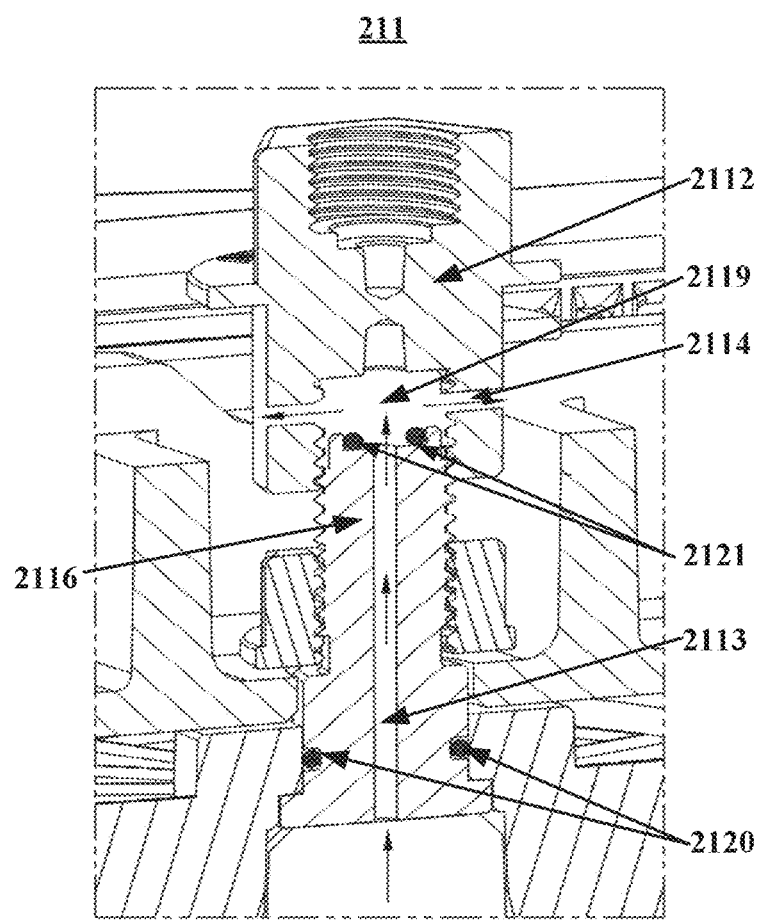
FIG. 8 is a schematic diagram of a structure of the exhaust valve in an opened state.

FIGS. 7 and 8 are schematic diagrams of structures of the exhaust valve in different operational states. As shown in FIGS. 7 and 8, the exhaust valve 211 includes a fixing portion 2111 and a moving portion 2112.

In this embodiment, the fixing portion 2111 is provided at the sealing portion 203, and includes a first exhaust passage 2113 running through the fixing portion 2111 from an upper end surface of the fixing portion 2111 to a lower end surface of the fixing portion 2111, the first exhaust passage 2113 being in communication with the accommodation space at the lower end surface of the fixing portion 2111.

And the moving portion 2112 is provided at an upper part of the sealing portion 203 and is movable between a first position and a second position, a second exhaust passage 2114 being formed in the moving portion 2112, the second exhaust passage 2114 running through the moving portion 2112 in a direction perpendicular to the first exhaust passage 2113, and the second exhaust passage 2114 being in communication with the outside;

In the embodiment of this application, as shown in FIG. 7, when the moving portion 2112 moves to the first position, the first exhaust passage 2113 is not in communication with the second exhaust passage 2114; and as shown in FIG. 8, when the moving portion 2112 moves to the second position, the first exhaust passage 2113 is in communication with the second exhaust passage 2114, so that the accommodation space is in communication with the outside through the first exhaust passage 2113 and the second exhaust passage 2114.

In the embodiment of this application, as shown in FIG. 7, the fixing portion 2111 may include a base 2115 and a column 2116; for example, the base 2115 may be embedded into the recessed portion 2031 of the sealing portion 203 and a hole in the cover 201, an edge of the base 2115 being pressed against an inner wall of the recessed portion 2031, thereby constrain a position of the base 2115, and an upper part of the base 2115 extending upwards to form the column 2116, threads 2117 being provided in an outer wall surface of the column 2116.

Furthermore, the liquid processing apparatus may include a fastener 2118, the fastener 2118 being in an annular shape, and threads being provided in its inner wall. The fastener 2118 may be nested at a periphery of the column 2116, and a lower end of the fastener 2118 is pressed against the upper surface of the cover 201, thereby making the fixing portion 2111 to be connected to the cover 201 and the sealing portion 203.

As shown in FIGS. 7 and 8, a recessed portion 2119 is formed at a lower part of the moving portion 2112, the second exhaust passage 2114 running through a side wall of the recessed portion 2119. Furthermore, threads may be provided in an inner wall of recessed portion 2119, and are fitted with the threads of the column 2116. The recessed portion 2119 may be nested at the periphery of an upper part of the column 2116, hence, by rotating the moving portion 2112, the moving portion 2112 may be guided to move on the column 2116 by means of the threads, thereby making the moving portion 2112 to move between the first position and the second position.

As shown in FIG. 7, when the exhaust valve 211 is in a closed state, the moving portion 2112 moves to the first position, and the upper part of the column 2116 blocks the second exhaust passage 2114; and as shown in FIG. 8, when the exhaust valve 211 is in an opened state, the moving portion 2112 moves to the second position higher than the first position, and the first exhaust passage 2113 is in communication with the second exhaust passage 2114 at the upper end surface of the column 2116, thereby discharging the air in the accommodation space through the first exhaust passage 2113 and the second exhaust passage 2114.

It should be noted that the embodiment of this application contains that the moving portion is driven by the threads to move on the column. However, this embodiment is not limited thereto, and other structures may also be used to drive the moving portion to move between the first position and the second position, for example, an elastic component or a magnetic component may be used to drive the moving portion.

Furthermore, the exhaust valve 211 may be provided at the center of the sealing portion 203, and may also be off the center.

Furthermore, as shown in FIG. 8, the exhaust valve 211 may include a sealing member 2120 and a sealing member 2121; for example, the sealing member 2120 may be located between an outer wall of the base 2115 of the fixing portion 2111 and the recessed portion 2031 and is configured to avoid leakage of the air in the accommodation space; and the sealing member 2121 is located at the top of the column 2116, and when the exhaust valve is in the closed state, the sealing member 2121 is pressed by the top of the column 2116 and an inner wall of the recessed portion 2119 of the moving portion and produces a sealing effect, thereby further avoiding communication of the first exhaust passage 2113 with the second exhaust passage 2114.

In the embodiment of this application, by providing the exhaust valve 211, pressure in the accommodation space may be released by discharge, and deformation of the housing due to excessive pressure may be avoided; and by opening the exhaust valve to make air pressure inside and outside of the housing balanced, such operations as opening of the cover, and the like, may be facilitated.

Turning back to FIG. 3, at least one of the liquid inflow portion 207 and the liquid outflow portion 208 may be a multiport joint, which may include a first joint, a second joint, a third joint, a fourth joint and a control valve.

In this embodiment, the first joint 2071 (2081) is configured to connect to a detection device; the second joint 2072 (2082) is configured for bypass connection; the third joint 2073 (2083) is connected to the housing of the liquid processing apparatus; the fourth joint 2074 (2084) is configured for liquid inflow or outflow; and the control valve 2075 (2085) is configured to control communication states of the second joint, the third joint and the fourth joint, the communication states corresponding to different operational modes of the multiport joint.

Figure 9:
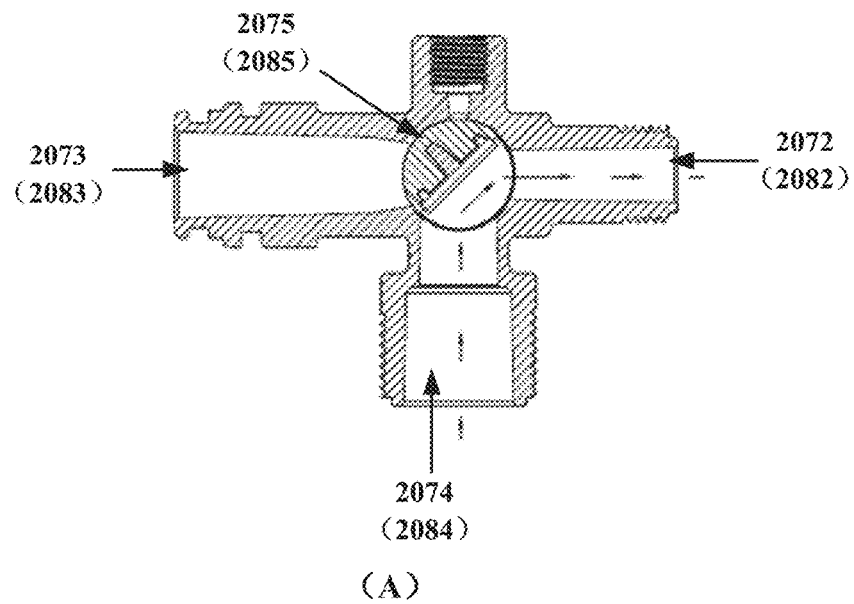
FIG. 9(A) is a schematic diagram of a communication state of a multiport joint when the joint is in a bypass mode.
FIG. 9(B) is a perspective view of the multiport joint in the bypass mode.
Figure 9:
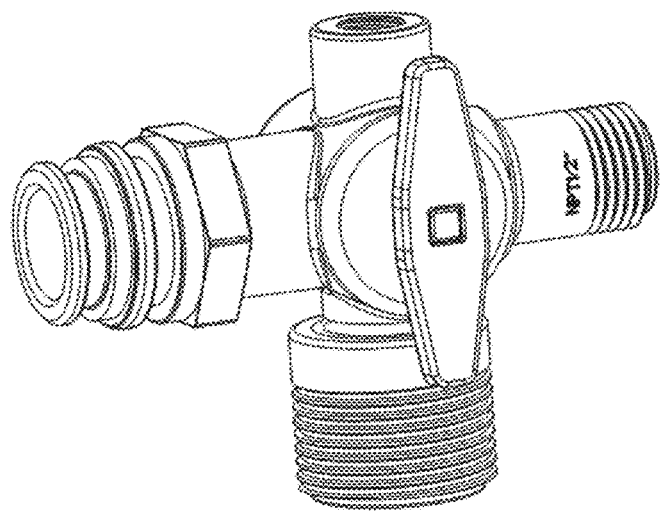

FIG. 9(A) is a schematic diagram of a communication state of the multiport joint when the joint is in a bypass mode. As shown in FIG. 9(A), in the bypass mode, the control valve controls that the second joint 2072 (2082) is in communication with the fourth joint 2074 (2084), so that the liquid flows between the second joint and the fourth joint. Hence, at the liquid inflow portion 207, the liquid flows into the liquid inflow portion 207, and may flow from the joint 2074 to the joint 2072, so as to supply liquid for a bypass; while at the liquid outflow portion 208, the liquid may flow from the joint 2082 to the joint 2084, so as to supply liquid to the joint 2084 through the bypass. Therefore, in a case where the liquid processing apparatus is not used, the liquid may be supplied for a bypass conduit or the liquid may be obtained from the bypass conduit. FIG. 9(B) is a perspective view of the multiport joint in the bypass mode.

Figure 10:
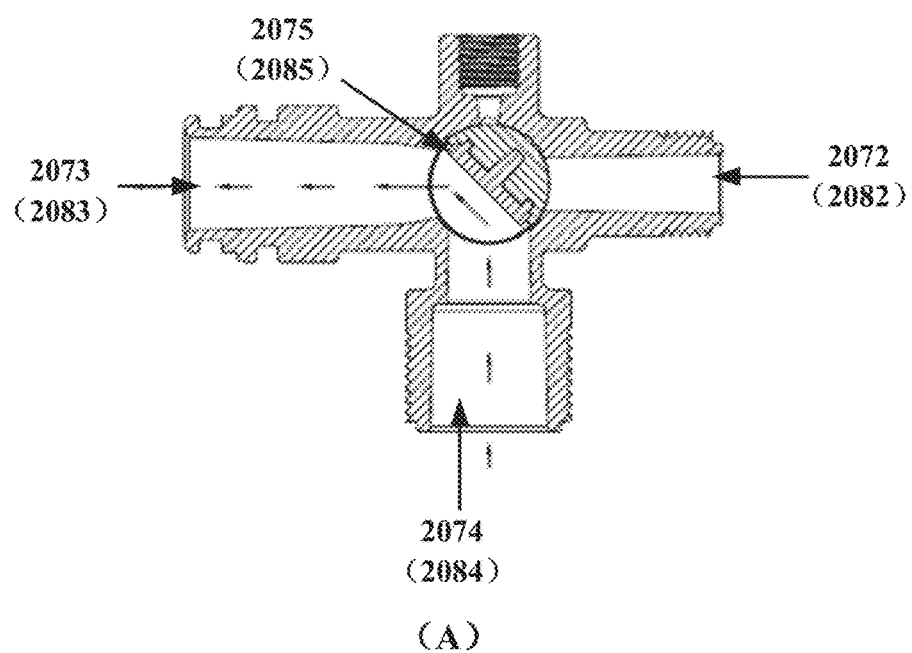
FIG. 10(A) is a schematic diagram of a communication state of the multiport joint when the joint is in a use mode.
FIG. 10(B) is a perspective view of the multiport joint in the use mode.
Figure 10:
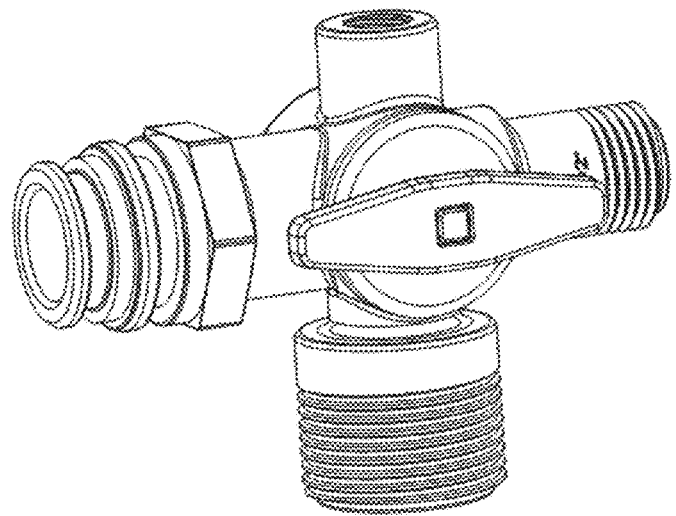

FIG. 10(A) is a schematic diagram of a communication state of the multiport joint when the joint is in a use mode. As shown in FIG. 10(A), at the use mode, the control valve controls that the third joint 2073 (2083) is in communication with the fourth joint 2074 (2084), so that the liquid flows between the third joint and the fourth joint. Hence, at the liquid inflow portion 207, the liquid may flow from the joint 2074 to the joint 2073, so as to supply liquid for the liquid processing apparatus; while at the liquid outflow portion 208, the liquid may flow from the joint 2083 to the joint 2084, so that the processed liquid in the liquid processing apparatus flows from the joint 2084. FIG. 10(B) is a perspective view of the multiport joint in the use mode.

Figure 11:
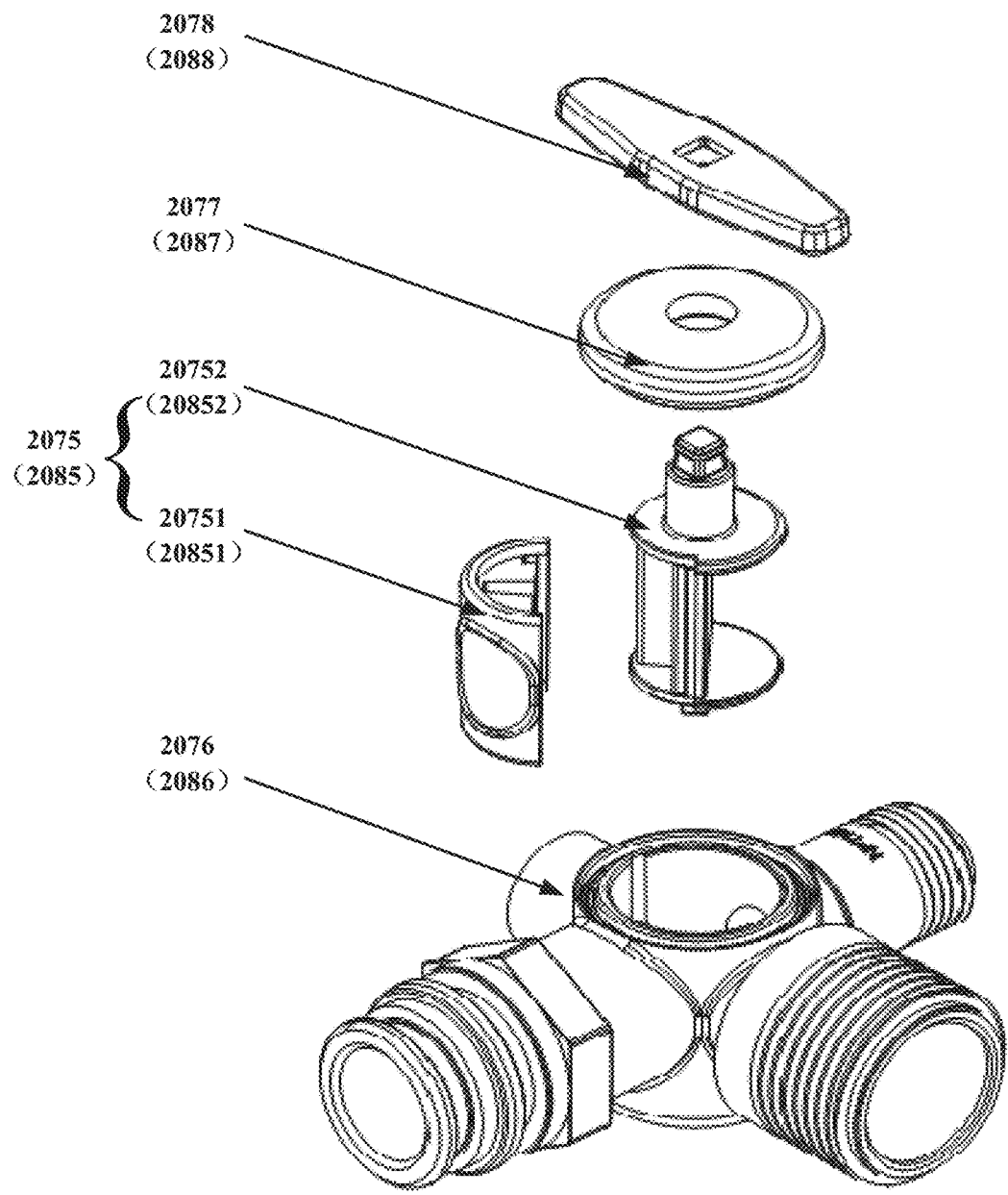
FIG. 11 is a schematic diagram of a structure of the multiport joint.

FIG. 11 is a schematic diagram of a structure of the multiport joint. As shown in FIG. 11, the four joints of the multiport joint may be provided on a joint body 2076 (2086), a cavity accommodating the control valve 2075 (2085) being provided within the joint body. The control valve 2075 (2085) may consist of a blocking film 20751 (20851) and a rotating portion 20752 (20852); for example, the blocking film is water impermeable, and is combined with the rotating portion. The rotating portion drives the blocking film to rotate, so that the blocking film blocks and seals the second joint 2072 (2082) or 2073 (2083), thereby changing a communication state of the joint.

As shown in FIG. 11, in this embodiment, the multiport joint may further include a sealing member 2077 (2087) and a knob 2078 (2088); for example, the sealing member is configured to seal the cavity, an end portion of the rotating portion 20752 (20852) passing through the sealing member and revealing from the cavity; and the knob is provided at an outer side of the sealing portion and combines with the end portion of the rotating portion revealing from the cavity, the rotating portion being enabled to rotate by an acting force applied by the knob.

Furthermore, in this embodiment, the detection device to which the first joint 2071 is connected may be a pressure detection device, a water quality detection device, or other detection devices.

In the embodiment of this application, by providing the multiport joint, provision of conduits related to the liquid processing apparatus may be made simple, and even in a case where the liquid processing apparatus is not used, the multiport joint may be made to be in a bypass mode, thereby normally supplying the liquid to the bypass conduit or obtaining the liquid from the bypass conduit.

Figure 12:
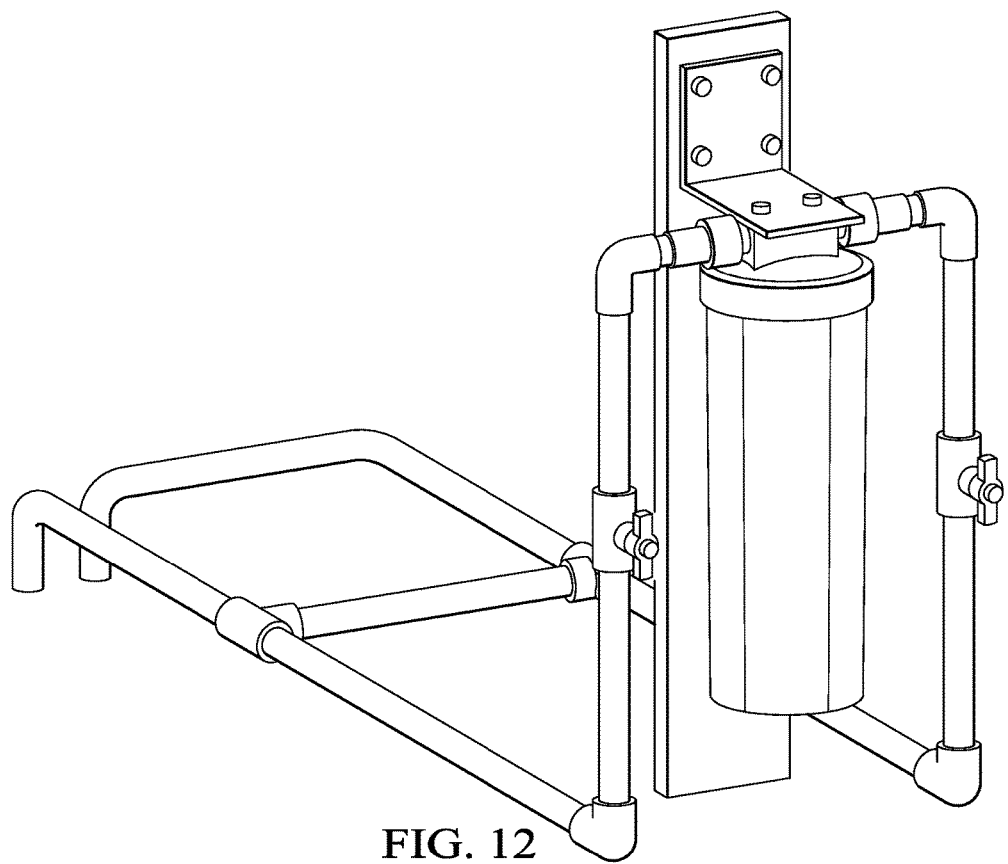
FIG. 12 is a photo of outside conduit setting of a liquid processing apparatus in the related art.
Figure 13:
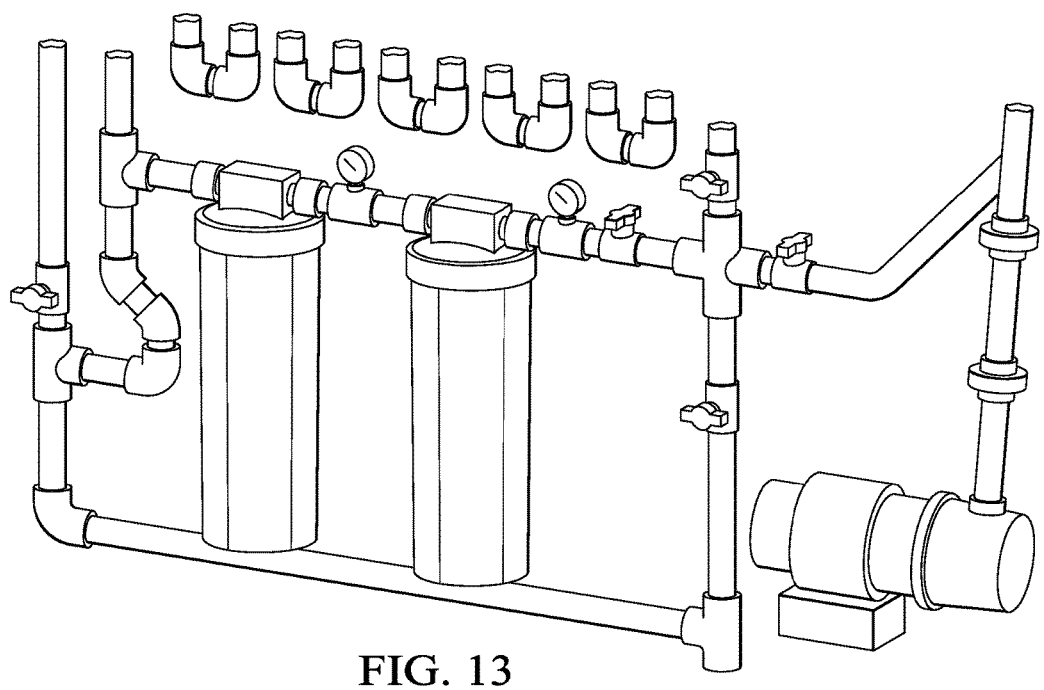
FIG. 13 is another photo of outside conduit setting of a liquid processing apparatus in the related art.

Being different from the embodiment of this application, in the related art, it is needed to provide multiple valves and/or detection devices for the liquid processing apparatus, hence, complex conduits need to be provided. FIGS. 12 and 13 are photos of outside conduit setting of the liquid processing apparatus in the related art. As shown in FIGS. 12 and 13, in the related art, coordination of multiple valves is needed to change directions of the flow of the liquid, hence, the setting of the conduits cannot be made simple.

Figure 14:
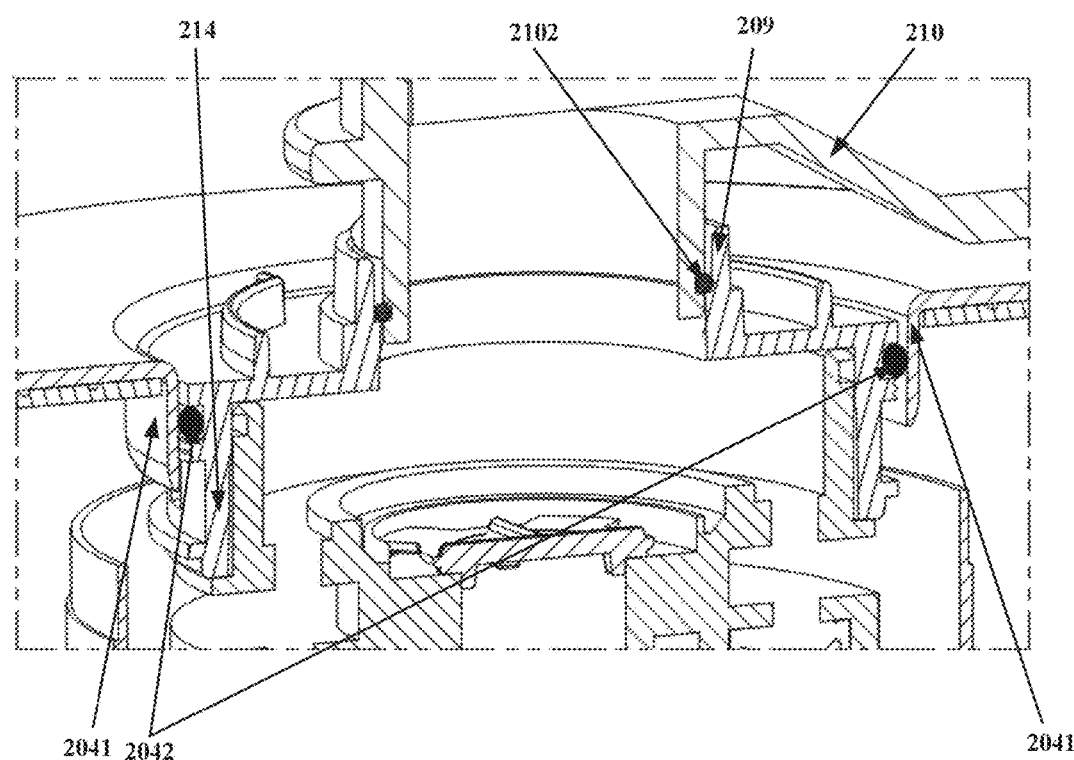
FIG. 14 is an enlarged view of near a top cover of a preprocessing portion of this embodiment.

FIG. 14 is an enlarged view of near the top cover of the preprocessing portion of this embodiment. As shown in FIG. 14, a seal ring 2102 for sealing is provided between an inner wall surface of the guide portion 209 and an outer side edge of the connector 210, and the seal ring 2042 for sealing is provided between the peripheral wall 214 of the processing portion 204 and the inner side edge of the top cover 2041 of the preprocessing portion 2047, thereby avoiding entrance of unprocessed liquid into processes liquid due to leakage of the liquid.

Furthermore, in the embodiment of this application, the guide portion 209 and the peripheral wall 214 of the processing portion may be integrally provided.

According to the embodiment of this application, the flange portion 205 may be provided beneath the sealing portion, which may improve the strength of the housing beneath the sealing portion, and maintain the sealing effect between the sealing portion and the inner wall of the housing; providing the liquid inflow portion 207 and the liquid outflow portion 208 at the upper part of the housing and providing the connection portion may facilitate installation of the liquid outflow portion and the liquid inflow portion; providing the exhaust valve 211 may facilitate release of the air pressure in the accommodation space; providing the multiport joint may make the setting of the conduits simple, and even in a case where the liquid processing apparatus is not used, the multiport joint may be made to be in a bypass mode, thereby normally supplying the liquid to the bypass conduit or obtaining the liquid from the bypass conduit; and providing the seal ring 2102 for sealing between the inner wall surface of the guide portion 209 and the outer side edge of the connector 210 and providing the seal ring 2042 for sealing between the peripheral wall 214 of the processing portion 204 and the inner side edge of the top cover 2041 of the preprocessing portion may make the processing portion to obtain a relatively reliable sealing effect.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. A liquid processing apparatus, comprising:
   a housing having an upper end opening and a sealed bottom, an outer wall of the housing close to the upper end opening being provided with threads;
   a cover covering the upper end opening of the housing and connected to the housing by the threads;
   a sealing portion provided inside the housing and located beneath a position of an inner wall of the housing to which the threads correspond, the sealing portion being in a shape of a circular disk and having a recessed portion, a seal ring for sealing being provided between a periphery of the sealing portion and the inner wall of the housing, and a sealed accommodation space being formed between the sealing portion and the bottom of the housing;
   a processing portion provided within the accommodation space and in which a liquid processing medium is provided, a peripheral wall of the processing portion being sealed, an upper end of the processing portion having a guide portion, a liquid entering into the processing portion through a bottom of the processing portion, and a liquid processed by the processing portion being guided by the guide portion;
   a liquid inflow portion and a liquid outflow portion provided at an upper part of the housing, the liquid inflow portion and liquid outflow portion being at the same horizontal level when an axis of the housing is in parallel with the gravity direction; wherein, the liquid flows into the accommodation space through the liquid inflow portion, and the liquid processed by the processing portion flows out of the accommodation space through the liquid outflow portion; and
   a connector connected between the guide portion and the liquid outflow portion and configured to guide the liquid processed by the processing portion to the liquid outflow portion; wherein, the connector has a protrusion portion, the protrusion portion being accommodated in the recessed portion of the sealing portion, and the connector is sealed by a second seal ring between an outer side edge of the connector and an inner wall surface of the guide portion.

2. The liquid processing apparatus according to claim 1, wherein the liquid processing medium is a liquid processing medium based on a template-assisted crystallization technology.

3. The liquid processing apparatus according to claim 1, wherein a preprocessing portion is provided outside of the processing portion,
   a bottom of the preprocessing portion being sealed, and an upper end of the preprocessing portion having an annular top cover;
   the liquid entering into an inner space of the preprocessing portion through a peripheral wall of the preprocessing portion, and a liquid processed by the preprocessing portion being guided by the guide portion after being processed by the processing portion;
   wherein, a third seal ring for sealing is provided between a peripheral wall of the processing portion and an inner side edge of the top cover of the preprocessing portion.

4. The liquid processing apparatus according to claim 1, wherein,
   the liquid processing apparatus further comprises an exhaust valve, the exhaust valve comprising:
   a fixing portion provided at the sealing portion, a first exhaust passage being formed in the fixing portion and running through the fixing portion from an upper end surface of the fixing portion to a lower end surface of the fixing portion, and the first exhaust passage being in communication with the accommodation space at the lower end surface of the fixing portion; and
   a moving portion provided at an upper part of the sealing portion and movable between a first position and a second position, a second exhaust passage being formed in the moving portion, the second exhaust passage running through the moving portion in a direction perpendicular to the first exhaust passage, and the second exhaust passage being in communication with an outside of the liquid processing apparatus;
   wherein, when the moving portion moves to the first position, the first exhaust passage is not in communication with the second exhaust passage, and when the moving portion moves to the second position, the first exhaust passage is in communication with the second exhaust passage, so that the accommodation space is in communication with an outside of the liquid processing apparatus through the first exhaust passage and the second exhaust passage.

5. The liquid processing apparatus according to claim 4, wherein,
   a recessed portion is formed in a lower part of the moving portion and is used for accommodating an upper part of the fixing portion, the second exhaust passage running through a side wall of the recessed portion;

when the moving portion moves to the first position, the upper part of the fixing portion blocks the second exhaust passage, and when the moving portion moves to the second position higher than the first position, the first exhaust passage is in communication with the second exhaust passage at the upper end surface of the fixing portion.

6. The liquid processing apparatus according to claim 1, wherein,
   the liquid processing apparatus further comprises a multiport joint, the multiport joint comprising:
   a first joint configured to connect to a detection device;
   a second joint configured for bypass connection;
   a third joint connected to the housing of the liquid processing apparatus;
   a fourth joint configured for liquid inflow or outflow; and
   a control valve configured to control communication states of the second joint, the third joint and the fourth joint inside the multiport joint, the communication states corresponding to different operational modes of the multiport joint.

7. The liquid processing apparatus according to claim 6, wherein,
   when the liquid processing apparatus operates at a bypass mode, the control valve controls that the second joint is in communication with the fourth joint, so that the liquid flows between the second joint and the fourth joint;
   and when the liquid processing apparatus operates at a use mode, the control valve controls that the third joint is in communication with the fourth joint, so that the liquid flows between the third joint and the fourth joint.

8. The liquid processing apparatus according to claim 1, wherein,
   the liquid processing apparatus further comprises a flange portion, the flange portion being located on the outer wall of the housing, and being provided at a position corresponding to the accommodation space.

\* \* \* \* \*